US009022400B2

(12) United States Patent
Porcheron

(10) Patent No.: US 9,022,400 B2
(45) Date of Patent: May 5, 2015

(54) MOTORIZED WHEELCHAIR

(71) Applicant: 4 Power 4, Brussels (BE)

(72) Inventor: Francois Porcheron, Brussels (FR)

(73) Assignee: 4 Power 4 (BE)

( * ) Notice: Subject to any disclaimer, the term of this patent is extended or adjusted under 35 U.S.C. 154(b) by 0 days.

(21) Appl. No.: 13/911,290

(22) Filed: Jun. 6, 2013

(65) Prior Publication Data

US 2013/0328282 A1 Dec. 12, 2013

(30) Foreign Application Priority Data

Jun. 6, 2012 (FR) ..................................... 12 55265

(51) Int. Cl.

| | |
|---|---|
| ***B60G 3/20*** | (2006.01) |
| ***A61G 5/04*** | (2013.01) |
| ***A61G 5/06*** | (2006.01) |
| ***A61G 5/10*** | (2006.01) |
| *A61G 5/12* | (2006.01) |

(52) U.S. Cl.

CPC *A61G 5/10* (2013.01); *A61G 5/045* (2013.01); *A61G 5/06* (2013.01); *A61G 2005/1078* (2013.01); *A61G 2005/121* (2013.01); *A61G 2203/14* (2013.01)

(58) Field of Classification Search

USPC ................ 280/755, 647, 250.1, 304.1, 47.16, 280/124.104, 124.116, 124.128; 180/65.1, 180/907

See application file for complete search history.

(56) References Cited

U.S. PATENT DOCUMENTS

| | | | | |
|---|---|---|---|---|
| 7,264,272 | B2 * | 9/2007 | Mulhern et al. | .............. 280/755 |
| 2005/0206149 | A1 | 9/2005 | Mulhern et al. | |

FOREIGN PATENT DOCUMENTS

| | | | |
|---|---|---|---|
| WO | 9744206 | A1 | 11/1997 |

* cited by examiner

*Primary Examiner* — Faye M. Fleming

(74) *Attorney, Agent, or Firm* — Cantor Colburn LLP

(57) ABSTRACT

A wheelchair including a chassis, two front suspension arms connected by a pivot link to the chassis and by a pivot link to a support assembly of a front wheel, two rear suspension arms connected by a pivot link to the chassis and by a pivot link to a support assembly of a rear wheel, and connecting means arranged to connect one of the front suspension arms to one of the rear suspension arms and to convert each rotational movement of the front suspension arm with respect to the chassis into a reverse rotational movement with respect to the chassis of the rear suspension arm to which it is connected by the connecting means, and vice versa.

10 Claims, 7 Drawing Sheets

MOTORIZED WHEELCHAIR

TECHNICAL FIELD

The present invention relates to a motorized wheelchair more particularly designed for handicapped persons or those with reduced mobility.

BACKGROUND

Traditionally, a motorized wheelchair for handicapped persons comprises a chassis supported by wheels and a motor designed to move the chair. Motorized wheelchairs generally have no suspension system, which is detrimental to user comfort, since shocks resulting from the condition of the road are directly passed on to the user.

Furthermore, when they do exist, the suspension systems equipping traditional wheelchairs generally create a pitching phenomenon, i.e., alternating tilting of the wheelchair forward and backward, for example after crossing an obstacle or due to acceleration or deceleration. This pitching of the chair is clearly detrimental to passenger comfort, since the latter is tossed forward and backward.

BRIEF SUMMARY

The present invention therefore aims to resolve all or some of these drawbacks by proposing a motorized wheelchair equipped with a suspension system ensuring better passenger comfort, in particular by avoiding pitching of the chair when it accelerates, decelerates, or travels over an irregular surface.

To that end, the present invention relates to a motorized wheelchair comprising a chassis, a seat attached to the chassis, and at least one motor designed to move the chair, characterized in that the chair comprises two front suspension arms, namely an upper front suspension arm and a lower front suspension arm, each front suspension arm being connected by a pivot link P1, P1' to the chassis and by a pivot link P2, P2' to a support assembly of a front wheel, such that the pivot links P1, P1' and P2, P2' form a deformable parallelogram P1, P1', P2, P2', two rear suspension arms, namely an upper rear suspension arm and a lower rear suspension arm, each rear suspension arm being connected by a pivot link P3, P3' to the chassis and by a pivot link P4, P4' to a support assembly of a rear wheel, such that the pivot links P3, P3' and P4, P4' form a deformable parallelogram P3, P3', P4, P4', and connecting means arranged to connect one of the front suspension arms to one of the rear suspension arms and to convert each rotational movement of said front suspension arm with respect to the chassis into a reverse rotational movement with respect to the chassis of the rear suspension arm to which it is connected by the connecting means, and vice versa, any pitching movement of the chair thereby being converted into a substantially vertical movement of the seat parallel to the plane formed by the bearing points of the wheels of the chair on the ground.

Thus, the wheelchair according to the invention offers the advantage of substantially improving user comfort, on the one hand by absorbing the shocks generated by the movement of the chair on an irregular surface, and on the other hand by substantially limiting pitching of the chair on an irregular surface or during acceleration or deceleration phases, in particular by means of the torque between one of the front suspension arms and one of the rear suspension arms, said torque creating a reversed and simultaneous rotation of the front suspension arms and rear suspension arms to better stabilize the chassis designed to support the user.

It is important to note that any pitching movement (diving forward of the chair or pulling up backward of the chair) is converted, by means of the deformable parallelograms forming the front and rear suspension arms and the connection between said deformable parallelograms, into a horizontal damping simply varying the height of the seat.

In other words, with the chair according to the invention, any pitching movement results in a substantially vertical movement (raising or lowering) of the seat, parallel to the plane formed by the bearing points of the wheels on the ground; the seat remains horizontal and moves away from or closer to the wheels.

According to one embodiment, the pivot links P2, P2', or the pivot links P4, P4', are positioned vertically relative to one another and connected to a pivot comprised in the support assembly that they connect to the front suspension arms, or respectively to the rear suspension arms, said support assembly comprising a free wheel flange mounted freely rotating with respect to the pivot.

In other words, the segment P2, P2' of the parallelogram P1, P1' P2, P2' or the segment P4, P4' of the parallelogram P3, P3', P4, P4' is substantially vertical. This arrangement advantageously makes it possible to ensure the verticality of the free pivot of the front or rear wheel during movement of the suspension. The risk of jittering of said free wheel is thereby limited and user comfort is improved.

According to one possibility, each motor is supported by one of the front or rear wheel support assemblies.

This configuration advantageously cancels out the reaction movements of the suspension during acceleration and braking, therefore the pulling up and diving of the chair during speed variation phases. There is therefore no need to increase the hardness of the suspension to combat these effects. User comfort is thereby improved.

Furthermore, the center of gravity of the wheelchair according to this embodiment of the invention is lowered and is closer to the ground for better stability.

According to one embodiment, the chair comprises return and/or damping means capable of absorbing the movements of the front and rear suspension arms, the return and and/or damping means being mounted cantilevered between one of these front suspension arms and one of the rear suspension arms.

This arrangement makes it possible, aside from performing a damping function, to advantageously use a single damping system for two wheels (one front wheel and one rear wheel) of the chair. It also makes it possible to increase the movement of the suspension arms, and therefore the damping quality.

Advantageously, the return and/or damping means comprise a spring-damper combination connected by a pivot link P7 to one of the front suspension arms and by a pivot link P8 to one of the rear suspension arms.

According to one embodiment, the connecting means are connected to one of the front suspension arms by a pivot link P5 and to one of the rear suspension arms by a pivot link P6.

Advantageously, the pivot link P5 and the pivot link P6 are arranged on either side of an axis I connecting that from among the pivot link P1 and the pivot link P1', and that from among the pivot link P2 or the pivot link P2', that connect the chassis to the front and rear suspension arms connected to each other by the connecting means.

This makes it possible to optimize the transmission of forces between the front suspension arm and the rear suspension arm coupled to each other by the connecting means.

According to one feature of the wheelchair according to the invention, the connecting means connect the upper front suspension arm and the upper rear suspension arm.

This arrangement has the advantage of a limited bulk.

According to one embodiment, the connecting means comprise a connecting rod.

According to one possibility, the connecting means comprise an elastic member.

BRIEF DESCRIPTION OF THE DRAWINGS

Other features and advantages of the present invention will clearly emerge from the detailed description below of one embodiment, provided as a non-limiting example, in reference to the appended drawings, in which.

DETAILED DESCRIPTION

Figure 1:
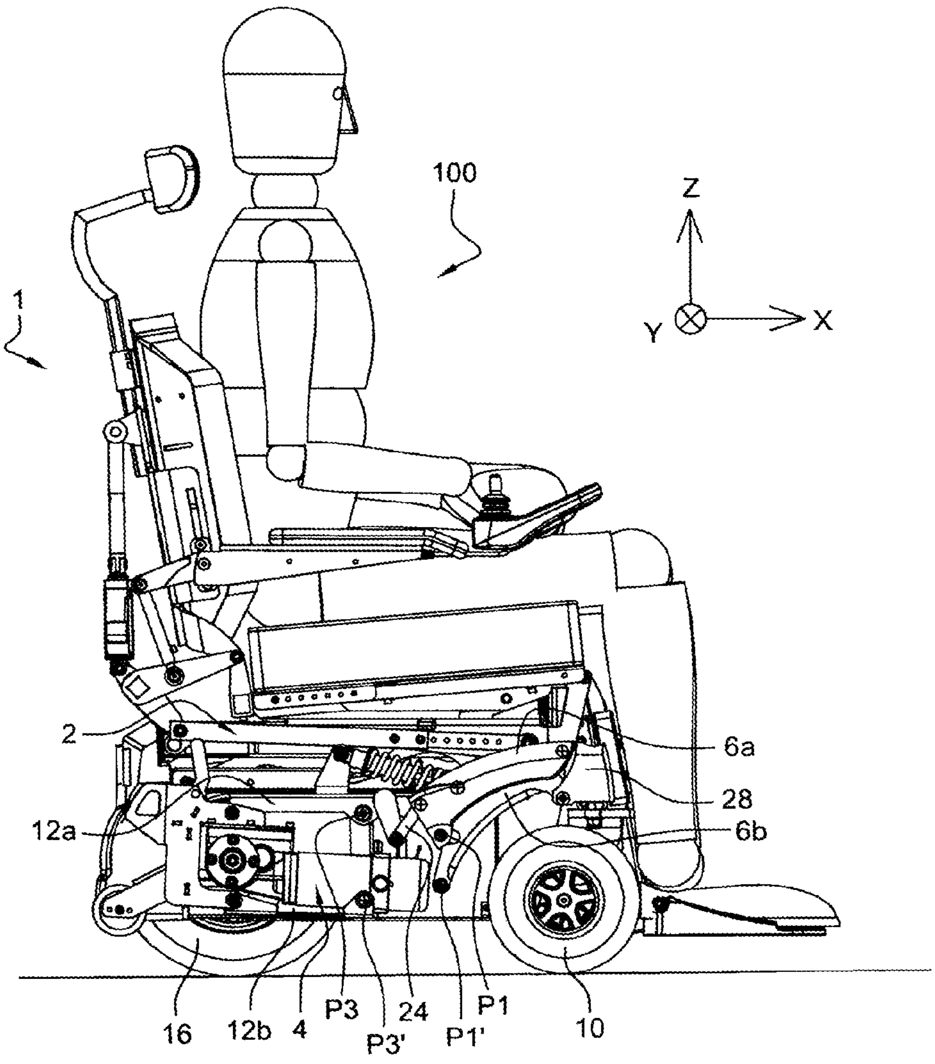
FIGS. 1 to 3 are overall and profile views of a wheelchair according to one embodiment of the invention, in different operating positions.

FIG. 1 shows a wheelchair 1 according to one embodiment of the invention.

It is specified that the description is done with respect to a Cartesian reference related to the chair 1, axis X being oriented in the longitudinal direction of the chair 1, axis Y being oriented in a transverse direction of the chair 1 and axis Z being oriented in the vertical direction of the chair 1. The orientations, directions and longitudinal, transverse, vertical, front, rear movements are thus defined with respect to that reference.

Figure 2:
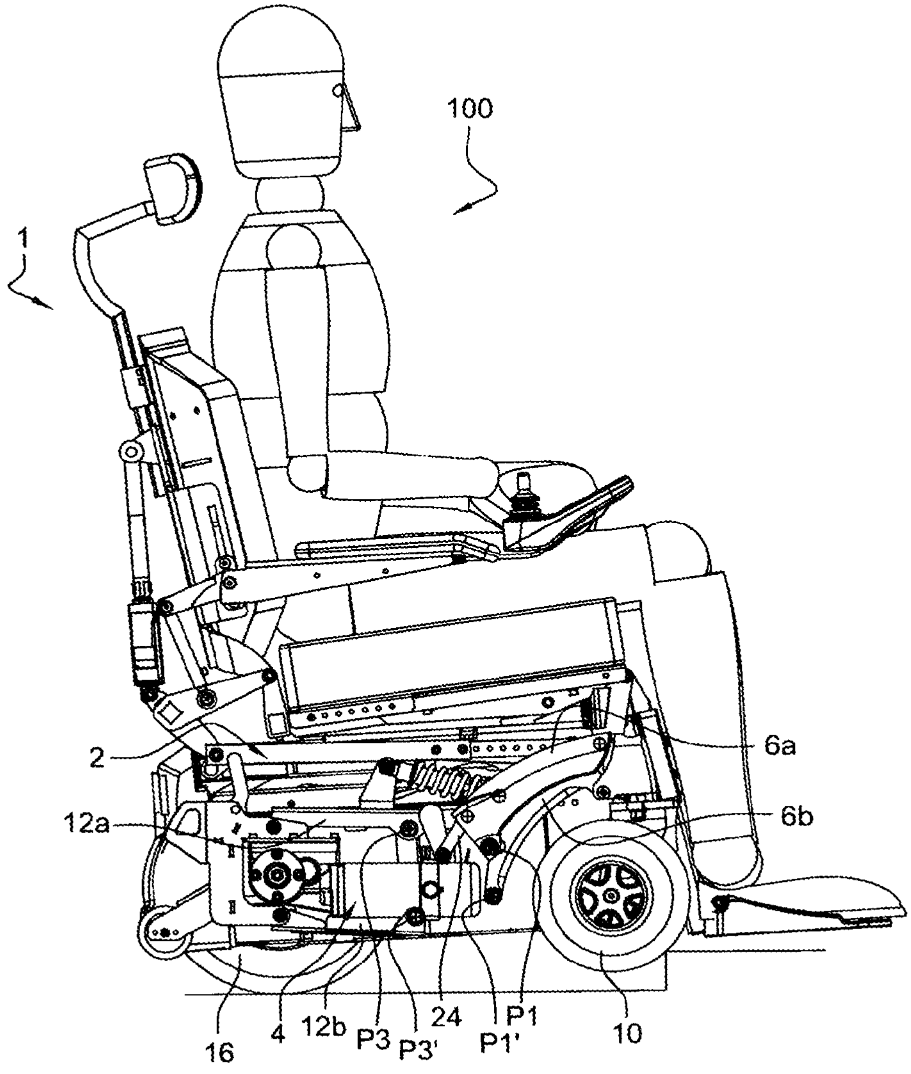
Figure 3:
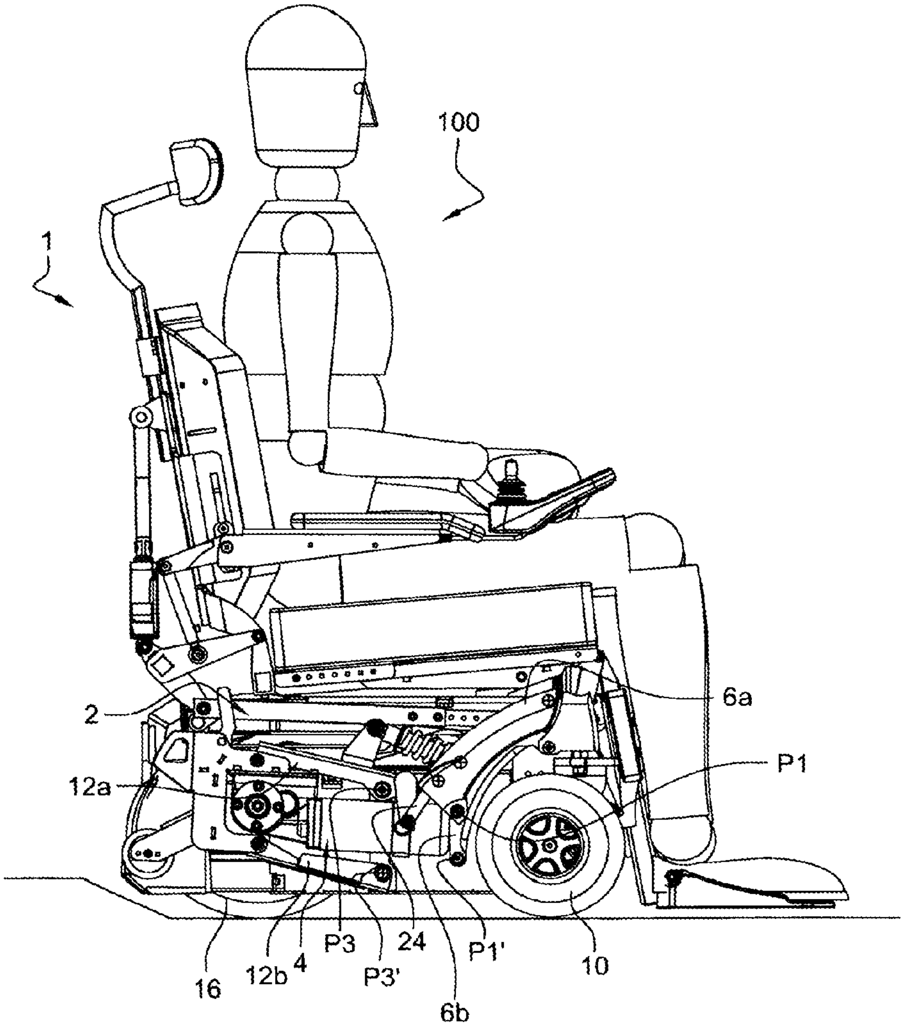

The wheelchair 1 comprises a chassis 2 designed to support a user 100, a seat secured to the chassis 2, and at least one motor 4 designed to pull or propel the wheelchair 1, as shown in FIGS. 1 to 3. The chair 1 may comprise four driving wheels.

Figure 4:
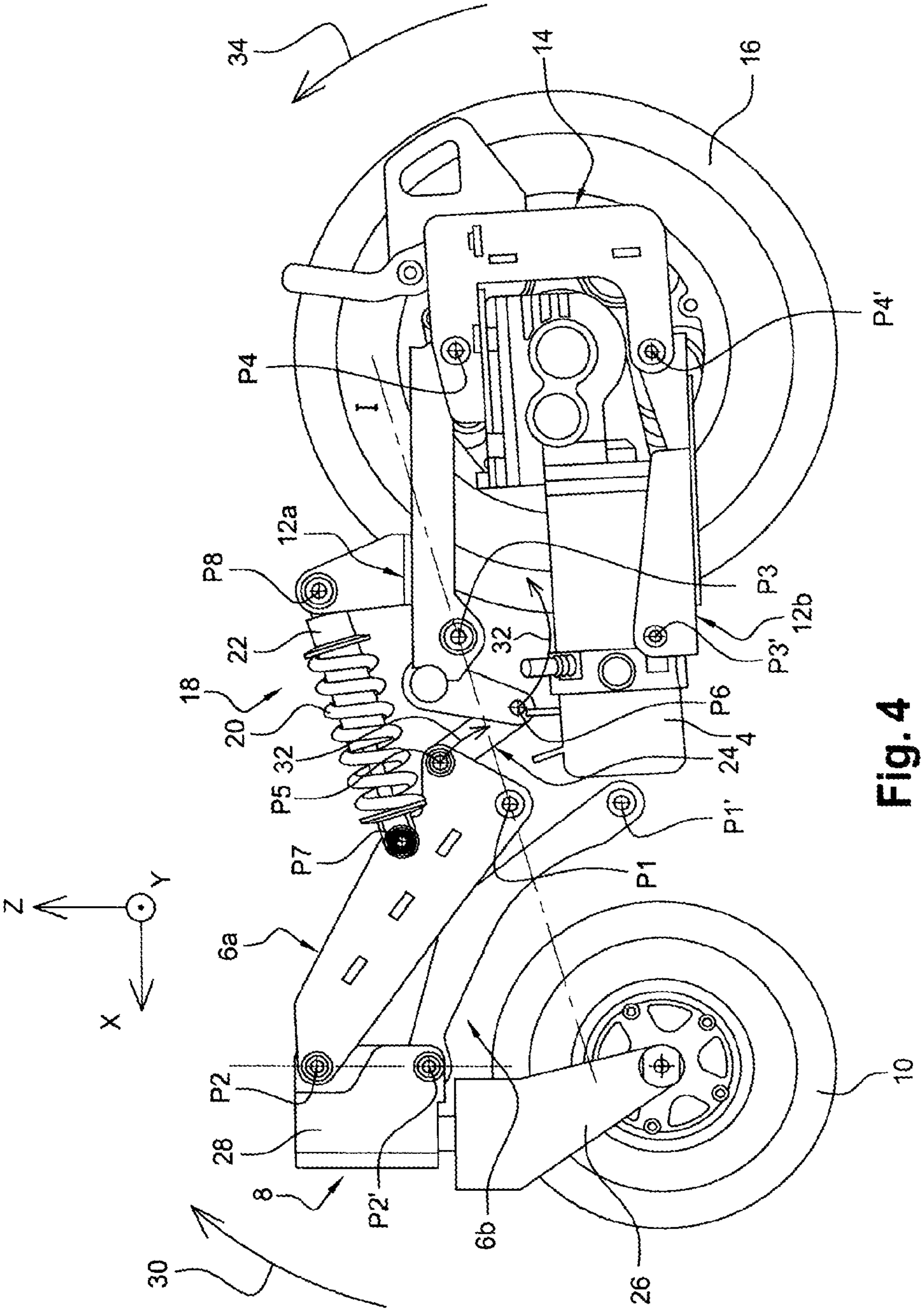
FIGS. 4 to 6 are profile views of the lower portion of a chair according to one embodiment of the invention, in different operating positions.
Figure 5:
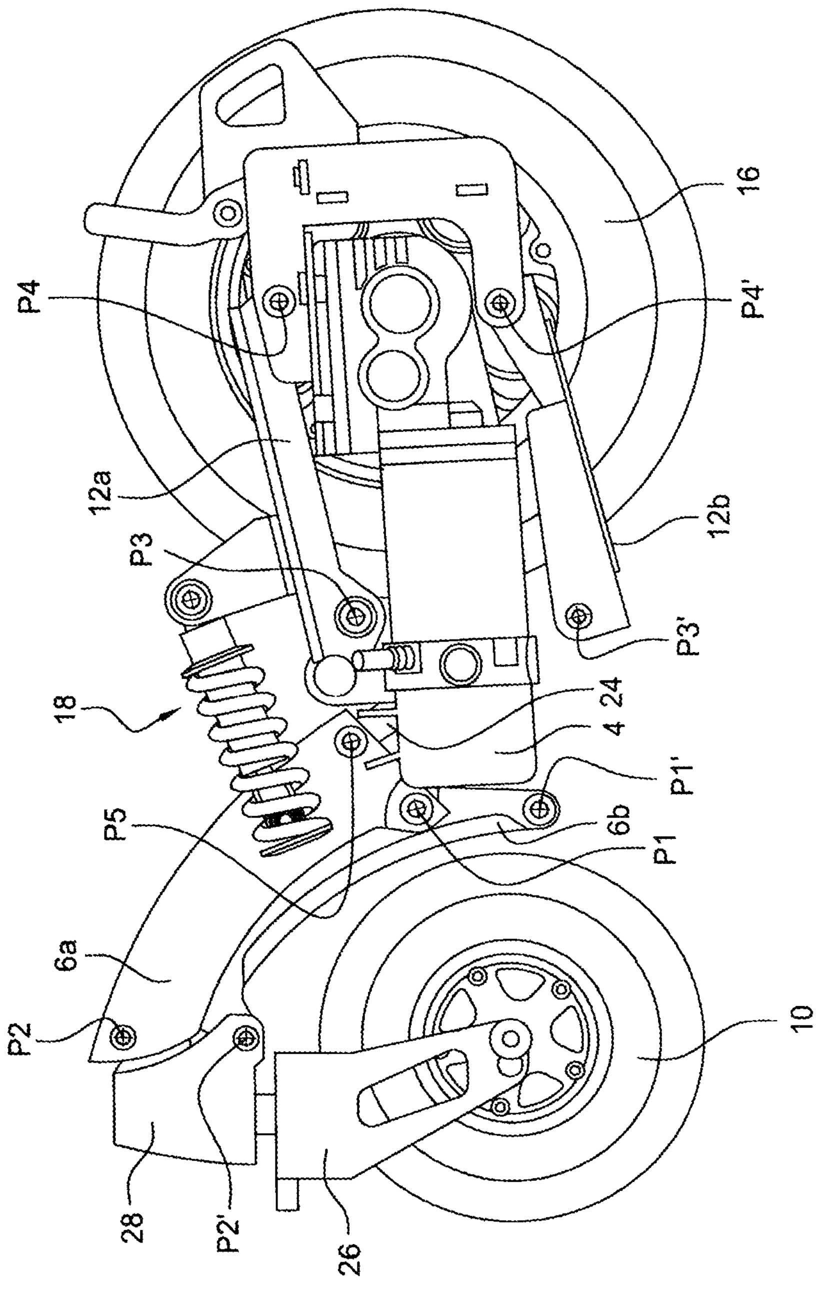
Figure 6:
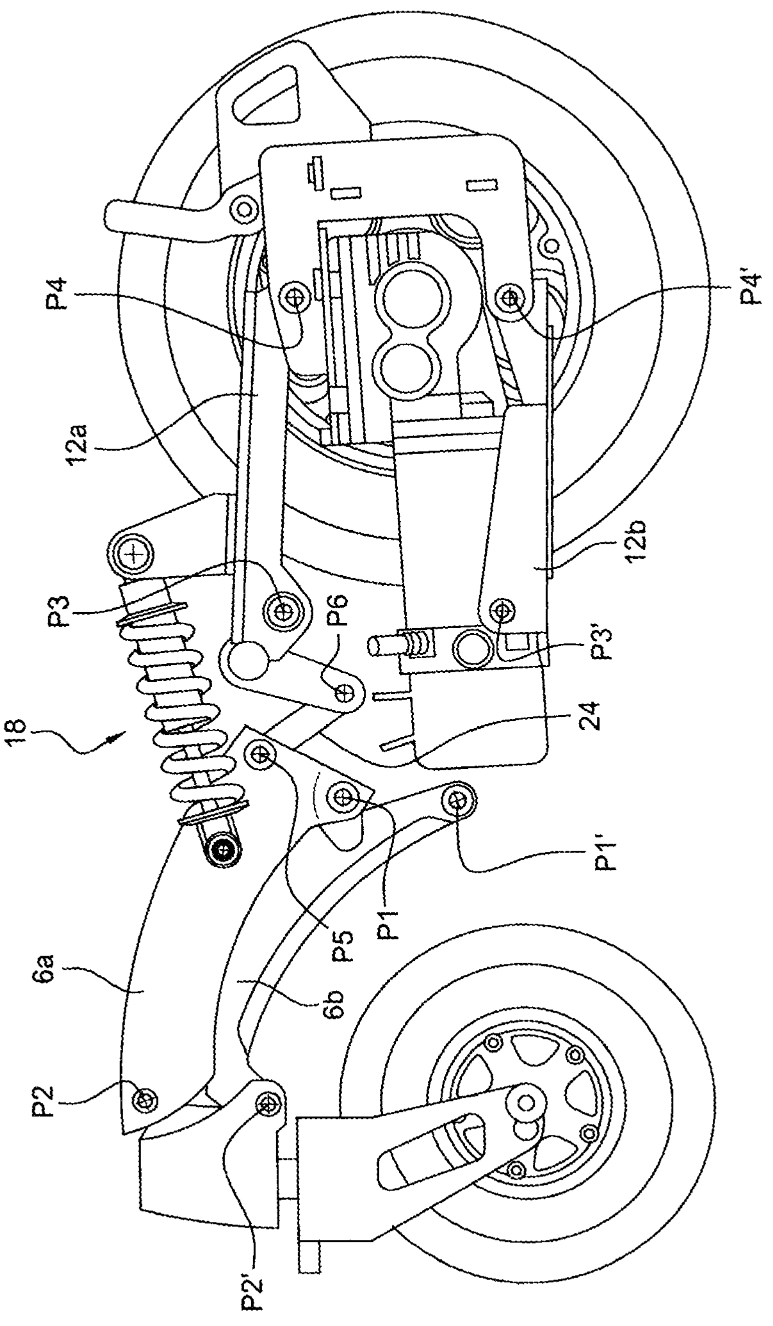

As shown in FIGS. 4 to 6, the wheelchair 1 also comprises two front suspension arms 6*a*, 6*b*, including an upper front suspension arm 6*a* and a lower front suspension arm 6*b*. The upper front suspension arm 6*a* is connected by a pivot link P1 with a transverse axis to the chassis 2 and by a pivot link P2 with a transverse axis to a support assembly 8 of a front wheel 10. The lower front suspension arm 6*b* is connected by a pivot link P1' with a transverse axis to the chassis 2 and by a pivot link P2' with a transverse axis to the support assembly 8 of the front wheel 10. The pivot links P1, P1', P2, P2' form a first deformable parallelogram (P1, P1', P2, P2'). The pivot links P1, P1' and the pivot links P2, P2' can be arranged substantially vertically, such that the sides (P1, P1') and (P2, P2') are substantially vertical.

The wheelchair 1 further comprises two rear suspension arms 12*a*, 12*b*, including an upper rear suspension arm 12*a* connected to the chassis 2 by a pivot link P3 with a transverse axis and to the support assembly 14 of the rear wheel 16 by a pivot link P4 with a transverse axis, and a lower rear suspension arm 12 connected to the chassis 2 by a pivot link P3' with a transverse axis and to the support assembly 14 of the rear wheel 16 by a pivot link P4' with a transverse axis. The pivot links P3, P3', P4, P4' form a second deformable parallelogram (P3, P3', P4, P4'). The pivot links P3, P3' and the pivot links P4, P4' can be arranged substantially vertically, such that the sides (P3, P3') and (P4, P4') are substantially vertical.

As shown in FIGS. 4 to 6, the chair 1 comprises return and/or damping means, such as a spring-damper combination 18 comprising a spring 20 cooperating with the damper 22 to absorb the movements of the front and rear suspension arms 6*a*, 6*b*, 12*a*, 12*b*.

The chair 1 also very advantageously comprises connecting means, for example a connecting rod 24, arranged to connect one of the front suspension arms 6*a*, 6*b* to one of the rear suspension arms 12*a*, 12*b* and convert each rotational movement of said front suspension arm with respect to the chassis 2 into a reverse rotational movement with respect to the chassis 2 of the rear suspension arm 12*a*, 12*b* to which it is connected by the connecting means. Reciprocally, the connecting means such as the connecting rod 24 convert each rotational movement of the rear suspension arm 12*a*, 12*b* into a reverse rotational movement of the front suspension arm 6*a*, 6*b* connected to the rear suspension arm 12*a*, 12*b* by said connecting rod 24.

In the example of FIGS. 1 to 7, the connecting rod 24 connects the upper front suspension arm 6*a* to the upper rear suspension arm 12*a*, to limit the bulk in the lower part of the chair 1, near the ground.

As shown in FIG. 3, the connecting rod 24 can be connected to the upper front suspension arm 6*a* by a pivot link P5 and to the upper rear suspension arm 12*a* by a pivot link P6.

The pivot link P5 and the pivot link P6 can be arranged on either side of an axis I connecting the pivot link P1 and the pivot link P2 to optimize the transmission of force from the upper front suspension arm 6*a* to the upper rear suspension arm 12*a*.

According to the embodiment illustrated in FIGS. 1 to 7, the spring-damper combination 18 can be mounted cantilevered between one of the front suspension arms 6*a*, 6*b* and one of the rear suspension arms 12*a*, 12*b*. In this case, the spring-damper combination 18 is mounted cantilevered between the upper front suspension arm 6*a* and the upper rear suspension arm 12*a*.

As shown in the different figures, the spring-damper combination 18 may be connected by a pivot link P7 to the upper front suspension arm 6*a* and by a pivot link P8 to the upper rear suspension arm 12*a*.

According to the described embodiment, the front wheels 10 are free. They may be mounted freely rotating around a substantially horizontal axis on a free wheel flange 26. Each free wheel flange 26 may then be mounted freely rotating around a substantially vertical axis with respect to a pivot 28. The pivot 28 and the flange 26 are part of the support assembly 8. The pivot 28 is connected to the upper front suspension arm 6*a* by the pivot link P2 and to the lower front suspension arm 6*b* by the pivot link P2'. The pivot links P2 and P2' are aligned substantially vertically and substantially parallel to the axis of rotation of the flange 26 with respect to the pivot 28.

According to the embodiment illustrated in FIGS. 1 to 7, the motor 4 is supported by the rear wheel 16 support assembly 14, which in turn is connected by the pivot links P4, P4' to the rear suspension arms 12*a*, 12*b*. The motor 4 is supported by the deformable parallelogram (P3, P3', P4, P4').

During operation, when the front wheels 10 (or the rear wheels 16) encounter an obstacle, as shown in FIG. 2, a force is exerted on the front (or rear) suspension arms 6*a*, 6*b*. In reaction, the front suspension arms 6*a*, 6*b* pivot with respect to the chassis 2 around the pivot links P1, P1', for example according to the arrow 30 in FIG. 3.

The rotation of the upper front suspension arm 6*a* generates a force 32 transmitted by the connecting rod 28 to the upper rear suspension arm 12*a*. The force 32 transmitted by the connecting rod 28 consequently causes the upper rear suspension arm 12*a* to rotate with respect to the chassis 2, around the pivot link P3, according to the arrow 34 in FIG. 3.

Due to the arrangement of the connecting rod 28, the rotational movement of the upper rear suspension arm 12*a* is reversed with respect to the rotational movement of the upper front suspension arm 6*a*. In other words, the rotational movement of the upper rear suspension arm 12*a* may be substantially symmetrical to that of the upper front suspension arm 6*a* with respect to a substantially transverse plane.

Figure 7:
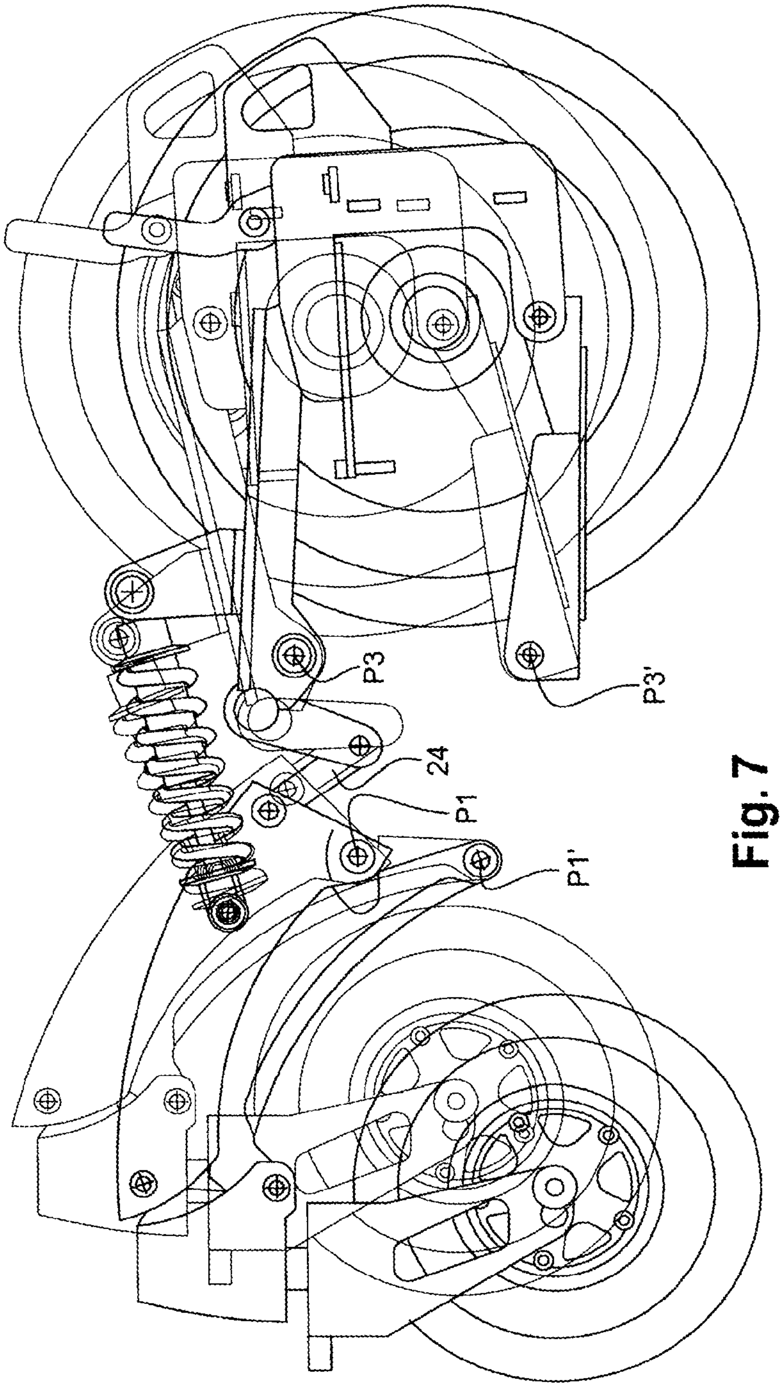
FIG. 7 is a transparent profile view comparatively showing two extreme movement positions of the front and rear suspension arms of the chair according to one embodiment of the invention.

FIGS. 5 and 6 show the suspension system for the chair 1 according to one example embodiment, in an extreme operating positions, superimposed on FIG. 7.

It is thus possible to see, due to the synchronized and reversed rotations of the front suspension arms 6*a*, 6*b* and rear suspension arms 12*a*, 12*b*, an elevation or descent phenomenon of the chassis 2 along axis Z with respect to the wheels of the chair 1, when the latter encounters an obstacle, travels over an irregular surface, or accelerates or decelerates, instead of a pitching phenomenon of the chair 2 marked by pulling up backward or diving forward of the chassis 2. Thus, the chair 1 "settles" itself vertically to avoid a pitching effect. It is also possible to observe a longitudinal approach or separation of the front 10 and rear 16 wheels.

Of course, the invention is in no way limited to the embodiment described above, that embodiment having been provided only as an example. Modifications remain possible, in particular in terms of the composition of various elements or by substituting technical equivalents, without going beyond the scope of protection of the invention.

Thus, instead of a connecting rod 24, the connecting means may for example comprise an elastic member, such as a spring, as a very slight pitching may be accepted by the user.

Thus, the motor 4 may be supported by the front wheel 10 support assembly 8, while the rear wheels 16 may be mounted free.

The invention claimed is:

1. A motorized wheelchair comprising:

a chassis, a seat attached to the chassis, and at least one motor designed to move the chair, wherein the chair comprises two front suspension arms, namely an upper front suspension arm and a lower front suspension arm, each front suspension arm being connected by a pivot link to the chassis and by a pivot link to a support assembly of a front wheel, such that the pivot links and form a deformable parallelogram, two rear suspension arms, namely an upper rear suspension arm and a lower rear suspension arm, each rear suspension arm being connected by a pivot link to the chassis and by a pivot link to a support assembly of a rear wheel, such that the pivot links and form a deformable parallelogram, and connecting means arranged to connect one of the front suspension arms to one of the rear suspension arms and to convert each rotational movement of said front suspension arm with respect to the chassis into a reverse rotational movement with respect to the chassis of the rear suspension arm to which it is connected by the connecting means, and vice versa, any pitching movement of the chair thereby being converted into a substantially vertical movement of the seat parallel to the plane formed by the bearing points of the wheels of the chair on the ground.

2. The wheelchair according to claim 1, wherein the pivot links, are positioned vertically relative to one another and connected to a pivot comprised in the support assembly that they connect to the front suspension arms, or respectively to the rear suspension arms, said support assembly comprising a free wheel flange mounted freely rotating with respect to the pivot.

3. The wheelchair according to claim 1, wherein each motor is supported by one of the front or rear wheel support assemblies.

4. The wheelchair according to claim 1, wherein the chair comprises return and/or damping means capable of absorbing the movements of the front and rear suspension arms, the return and/or damping means being mounted cantilevered between one of these front suspension arms and one of the rear suspension arms.

5. The wheelchair according to claim 4, wherein the return and/or damping means comprise a spring—damper combination connected by a pivot link to one of the front suspension arms and by a pivot link to one of the rear suspension arms.

6. The wheelchair according to claim 1, wherein the connecting means are connected to one of the front suspension arms by a pivot link and to one of the rear suspension arms by a pivot link.

7. The wheelchair according to claim 6, wherein the pivot link and the pivot link are arranged on either side of an axis connecting that from among the pivot link and the pivot link, and that from among the pivot link or the pivot link, that connect the chassis to the front and rear suspension arms connected to each other by the connecting means.

8. The wheelchair according to claim 1, wherein the connecting means connect the upper front suspension arm and the upper rear suspension arm.

9. The wheelchair according to claim 1, wherein the connecting means comprise a connecting rod.

10. The wheelchair according to claim 1, wherein the connecting means comprise an elastic member.

* * * * *